United States Patent
Pang et al.

(10) Patent No.: US 7,123,558 B2
(45) Date of Patent: Oct. 17, 2006

(54) METHOD OF SEAMLESS ZCLV/PCAV RECORDING FOR PACKET WRITING

(75) Inventors: Chia-Yuan Pang, Taipei (TW); Ren-Chien Fu, Taipei (TW); Chien-Chun Ma, Taipei (TW)

(73) Assignee: Lite-On It Corporation, Taipei (TW)

( * ) Notice: Subject to any disclaimer, the term of this patent is extended or adjusted under 35 U.S.C. 154(b) by 428 days.

(21) Appl. No.: 10/709,029

(22) Filed: Apr. 8, 2004

(65) Prior Publication Data

US 2004/0202071 A1    Oct. 14, 2004

(30) Foreign Application Priority Data

Apr. 10, 2003    (TW) .............................. 92108323 a

(51) Int. Cl.
*G11B 5/09*    (2006.01)

(52) U.S. Cl. .............................. 369/47.21; 369/47.15; 369/53.44; 369/59.26

(58) Field of Classification Search .................... None
See application file for complete search history.

(56) References Cited

U.S. PATENT DOCUMENTS 6,775,211 B1 *   8/2004   Tsukihashi ............... 369/47.28
6,785,213 B1 *   8/2004   Shishido et al. ......... 369/59.25

\* cited by examiner

*Primary Examiner*—Muhammad Edun
(74) *Attorney, Agent, or Firm*—Winston Hsu

(57) ABSTRACT

When recording to an optical disk under zoned constant linear velocity (ZCLV) or partial constant angular velocity (PCAV) control, a plurality of super link points are dynamically set in the packet link areas. In this way, packet units recorded on a track of the optical disk are kept continuous.

12 Claims, 6 Drawing Sheets

METHOD OF SEAMLESS ZCLV/PCAV RECORDING FOR PACKET WRITING

BACKGROUND OF INVENTION

1. Field of the Invention

The present invention relates to a method of data recording on an optical disk, and more particularly, to a method of seamless ZCLV/PCAV recording for packet writing.

2. Description of the Prior Art

Generally speaking, in a rewritable optical disk drive, there are several methods of speed control of data writing to an optical disk (CD-R or CD-RW).

(1) Constant Linear Velocity, CLV:

CLV means that the optical disk is controlled such that a track length passing by an optical pickup head per unit time is constant. That is to say, when the optical pickup head accesses the inner region of an optical disk, a spindle motor rotates faster. On the contrary, when the optical pickup head accesses the outer region of an optical disk, the spindle motor rotates slowly. Under the control of CLV, the rotating speed of the spindle motor is related to the position of pickup head relative to the optical disk. That is, when the optical pickup head is moving from the inner to the outer region of the optical disk, the rotating speed of the spindle motor is gradually slowing down. Generally, a 1× optical disk drive is defined as the relative velocity between the optical pickup head and the optical disk is from 1.2 m/s to 1.4 m/s with 4.3218 MB/s transmission rate. Other optical disk drive with higher speeds are defined as integer multiples of the above values, such as 2×, 4×, 8×, 16×, 20×, etc.

(2) Constant Angular Velocity, CAV:

CAV means that the rotating speed of the spindle motor is constant. That is, when the rotating speed of the spindle motor is constant, the transmission rates in the inner and the outer region of the optical disk differ substantially. In other words, when the optical pickup head accesses the inner region of the optical disk, the transmission rate is lower; on the contrary, when the optical pickup head accesses the outer region of the optical disk, the transmission rate is higher.

(3) Zoned Constant Linear Velocity, ZCLV:

ZCLV improves a drawback of CLV, which is that the transmission rate is constant, so as to yield improvements in the transmission rate. Please refer to FIG. 1. FIG. 1 is a diagram of data transmission rate versus time on an optical disk 10 when performing data writing under ZCLV. FIG. 2 shows each region in the optical disk 10. In this case, the optical disk 10 is divided into three zones according to the time points A and B on the track. Before the time point A (10:0:0), the data transmission rate is 16× for performing data writing. Between the time points A (10:0:0) and B (50:0:0), the data transmission rate is 20× for performing data writing. And after the time point B (50:0:0), the data transmission rate is 24× for performing data writing.

Under ZCLV, the transmission rate close to the outer region of the optical disk is much higher resulting in increased speed of data writing in the optical disk. When changing from a region to another region, the optical disk drive has to reestablish a CLV control in the new region. That is, an adjustment of the spindle motor is performed at the starting point of each region to make the data transmission rate proper. Then, writing data in the new region is started. While the optical pickup head moves from the inner to the outer region of the optical disk, the rotating speed of the spindle motor slows for maintaining the constant linear velocity in the region. The total time for data writing in the optical disk by using ZCLV control is smaller than that by using CLV control.

(4) Partial Constant Angular Velocity, PCAV:

Please refer to FIG. 3. FIG. 3 is a diagram of data transmission rate versus time on an optical disk 10 when performing data writing under PCAV. FIG. 4 shows each region in the optical disk 10. In this case, the optical disk 10 is divided into a CLV region and a CAV region according to the time point C on the track. Before the time point C (50:0:0), the spindle motor provides a constant rotating speed; therefore, the transmission rate at the initial position is 16×. Approaching the time point C (50:0:0), the transmission rate increases to 24×. After the time point C (50:0:0), the transmission rate stays at 24× CLV for performing data writing.

In the prior art, performing data writing under ZCLV or PCAV must provide accurate time points of the optical disk drive. That is to say, when performing data writing, an accurate time point for changing the transmission rate should be obtained first. Then, the rotating speed of the spindle motor is adjusted after the time point. Generally speaking, these time points are called super link points. As mentioned above, the time points A, B and C are super link points.

Data writing is controlled at different transmission rates before and after super link points. Thus, during the process of data writing, when reaching a super link point, the optical disk drive must stop writing and reaccelerate the spindle motor until the spindle motor rotates at the predetermined rotating speed. Then the optical disk drive continues writing data subsequent to the super link point. Generally, when an optical disk drive writes data, data is continually written along the track. However, data is discontinuously written at the super link points; therefore, during data access, an error message will be generated when the optical pickup head access data from super link points. Nowadays optical disk drive control chips can correct data by an error correct code when decoding data before and after a super link point.

A packet writing mode (or "packet write") is introduced in the specification of orange book. Please refer to FIG. 5. FIG. 5 is a diagram of packets in packet writing. Packet writing means that the optical disk drive uses a packet unit for writing data on the track of an optical disk. As shown in FIG. 5, each packet unit 20, 30 and 40 respectively includes a run in area 22, 32 and 42, and a run out area 26, 36 and 46. And user data areas 24, 34 and 44 are between the run in areas 22, 32 and 42 and the run out areas 26, 36 and 46. There are packet link areas 50 and 60 between the packet units 20, 30 and 40 for connecting the packet units. For instance, the packet link area 50 is between the packet units 20 and 30, and the packet link area 60 is between the packet units 30 and 40. Only data stored in the user data areas 24, 34 and 44 can be accessed. The run in areas 22, 32 and 42, run out areas 26, 36 and 46, and packet link areas 50 and 60 cannot be accessed.

In general, when an optical disk drive writes data under ZCLV or PCAV, accurate time points should be provided as super link points. Due to the greater part of a packet unit being the user data area, during packet writing under ZCLV or PCAV according to the prior art, the majority of the super link points are located in the user data area of the packet unit. Because super link points represent switches in transmission rate, if a super link point is located in a user data area, it will make data in the user data area discontinuous. Additionally, when performing data writing subsequent to the super link point, the optical disk drive has to reaccelerate the spindle motor for performing data writing. This reduces the efficiency when the optical disk drive writes data.

SUMMARY OF INVENTION

It is therefore a primary objective of the claimed invention to provide a method that can perform seamless ZCLV/PCAV recording for packet writing in an optical disk. When writing packet units on the track of an optical disk under ZCLV/PCAV control, the super link points are dynamically set in the packet link areas.

It is an advantage of the claimed invention that the method can perform seamless ZCLV/PCAV recording for packet writing in an optical disk. The method comprises providing super link points for dividing a track of an optical disk into a plurality of areas, completely writing packet units on the track, and if a difference between a packet link area subsequent to the packet unit and one of the super link points is within a predetermined range, the super link point is set within the packet link area.

It is another advantage of the claimed invention that the method can perform seamless ZCLV/PCAV recording for packet writing in an optical disk. A plurality of super link points is provided for dividing a track of an optical disk into a plurality of data writing areas with different transmission rates. Many packet units can sequentially be written on the track, and there are packet link areas between each packet unit. The characteristic of the claimed invention is that all the super link points are set in part of the packet link areas.

These and other objectives of the present invention will no doubt become obvious to those of ordinary skill in the art after reading the following detailed description of the preferred embodiment that is illustrated in the various figures and drawings.

DETAILED DESCRIPTION

In the prior art, when an optical disk drive writes data, accurate time points should be provided as super link points. Therefore, when performing data writing, the super link points are typically located in the user data areas of the packet units. This makes data in the user data areas discontinuous and reduces the efficiency when the optical disk drive writes data. The present invention provides a dynamic adjustment of super link points. When the optical disk drive performs packet unit writing, super link points indicating changing transmission rates will not be located in the user data areas of the packet units to achieve seamless ZCLV/PCAV recording for packet writing.

Figure 1:
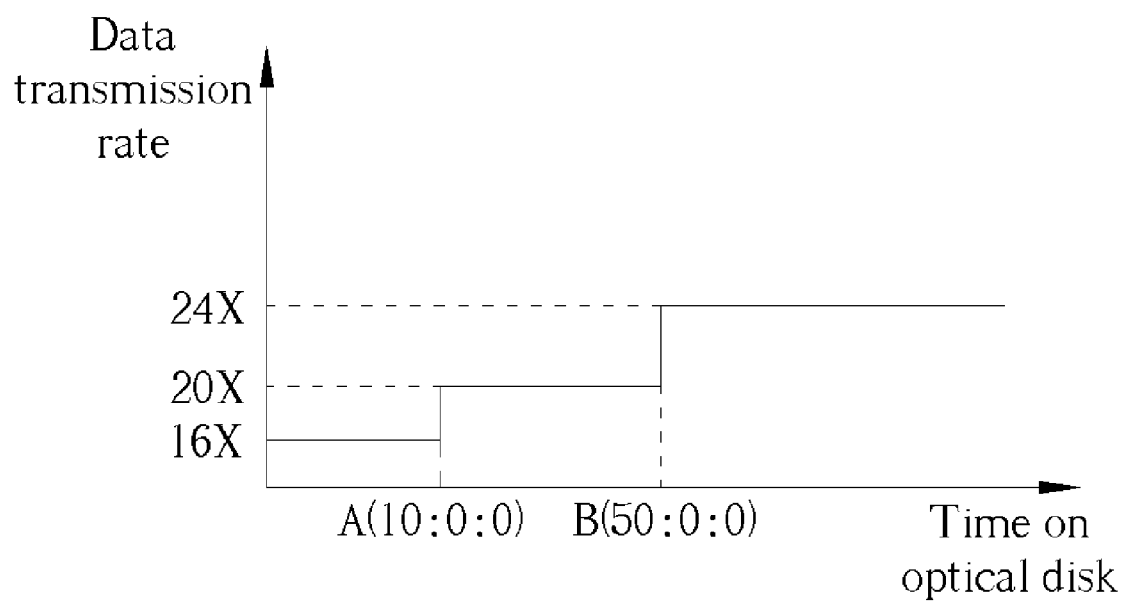
FIG. 1 is a diagram of data transmission rate versus time on an optical disk when performing data writing under ZCLV.
Figure 2:
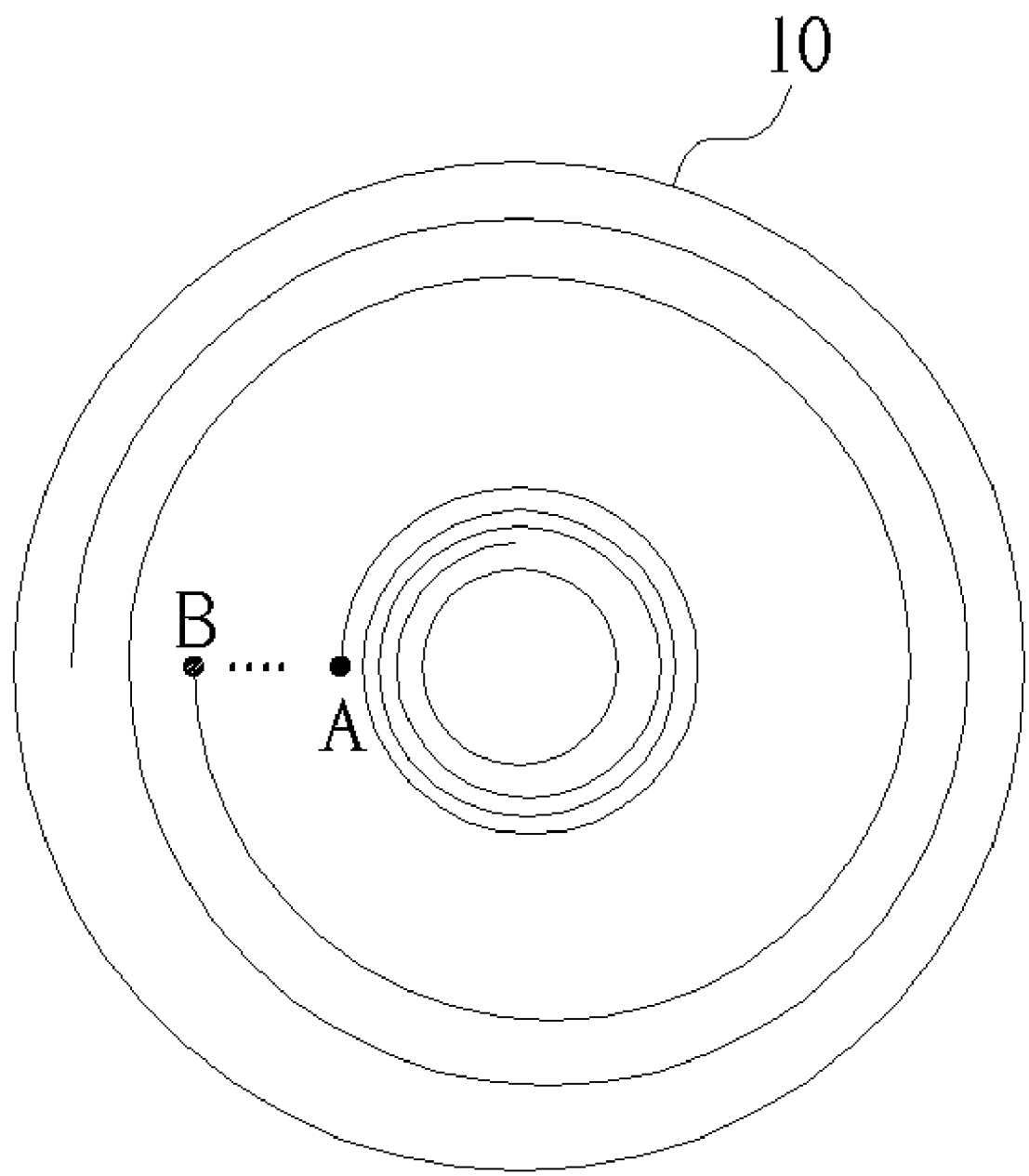
FIG. 2 shows each region in the optical disk.
Figure 3:
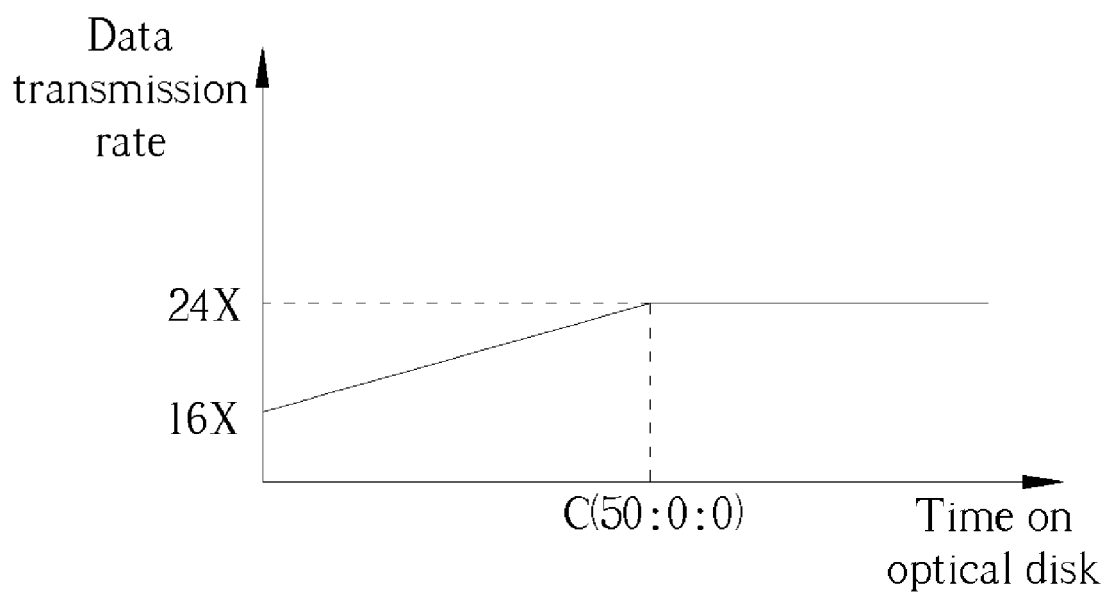
FIG. 3 is a diagram of data transmission rate versus time on an optical disk when performing data writing under PCAV.
Figure 4:
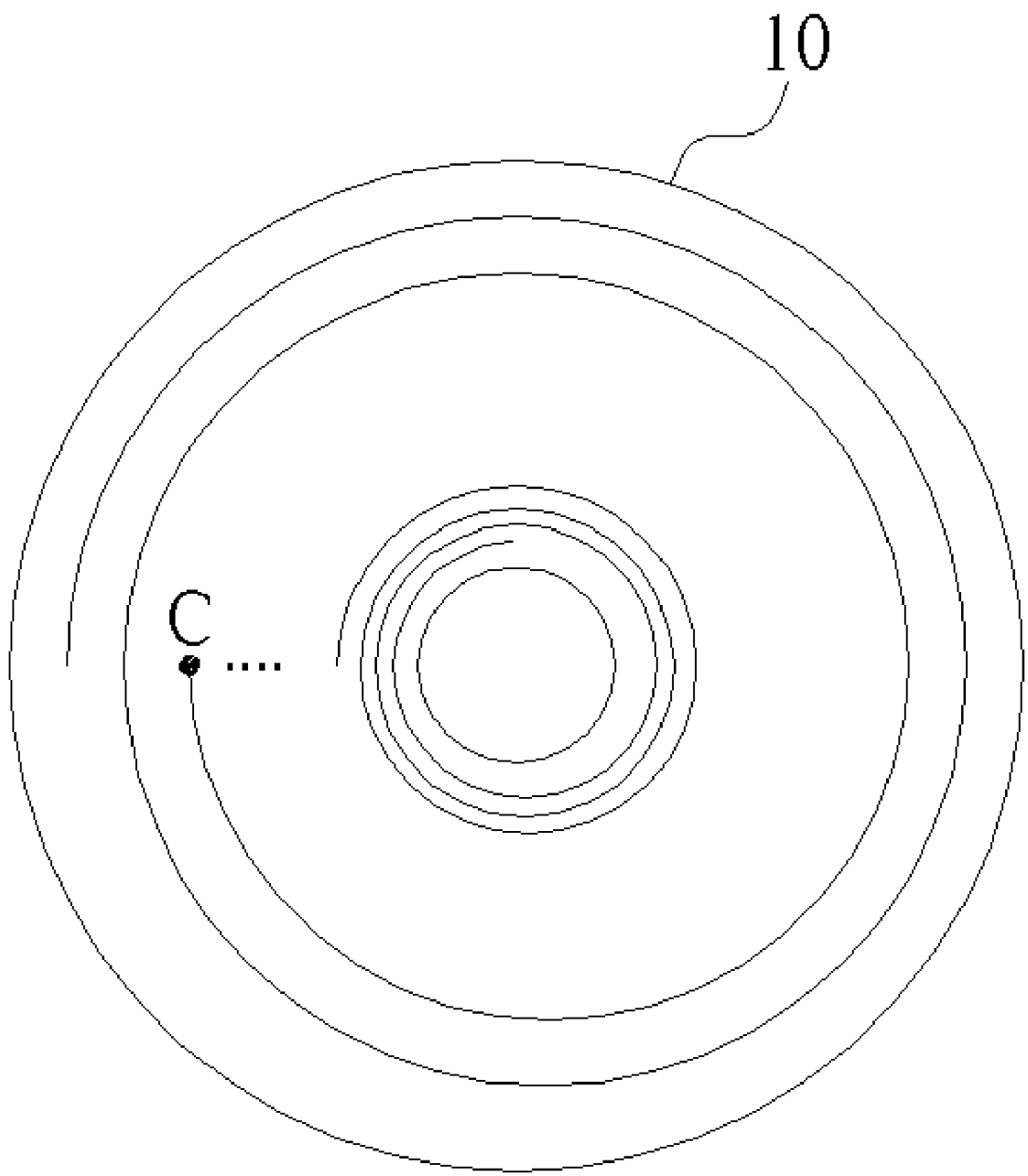
FIG. 4 shows each region in the optical disk.
Figure 5:
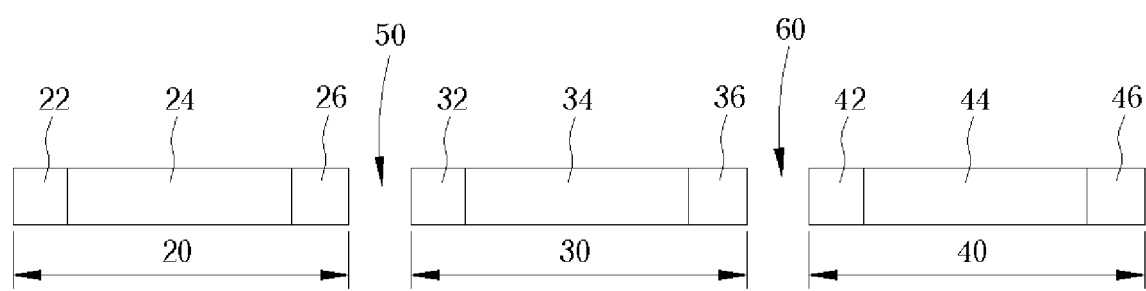
FIG. 5 is a diagram of packets in packet writing.
Figure 6:
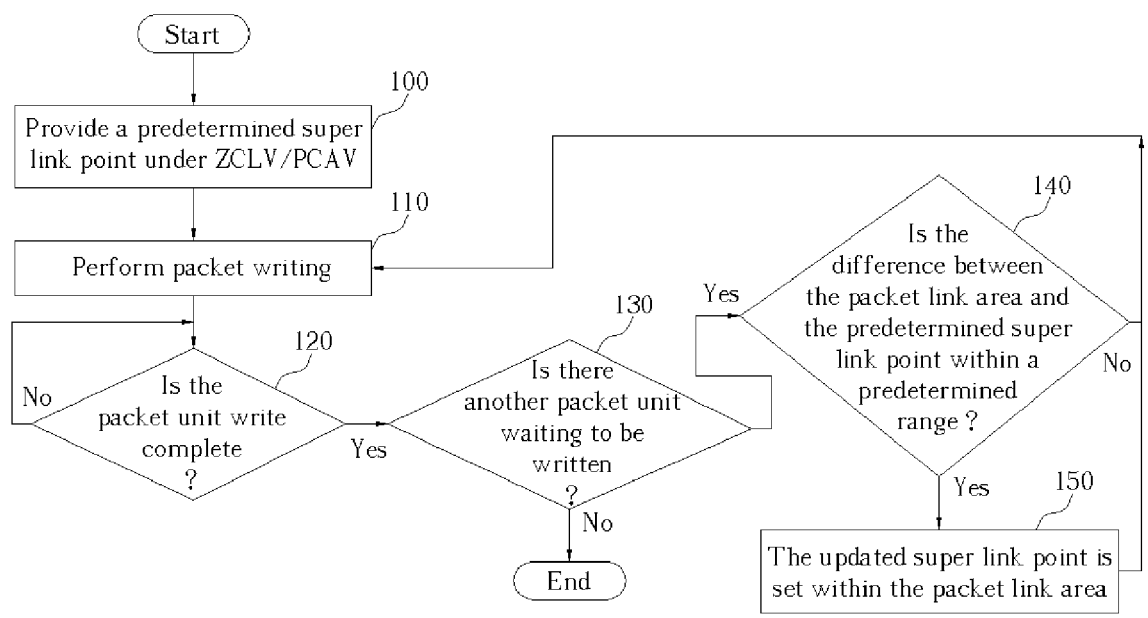
FIG. 6 is a flowchart of the present invention.

Please refer to FIG. 6. FIG. 6 is a flowchart of the present invention.

Step 100: Provide a predetermined super link point under ZCLV/PCAV control.

Step 110: Perform packet writing.

Step 120: Is the packet unit writing complete? If yes, go to step 130; otherwise, stay in step 120.

Step 130: Is there another packet unit waiting to be written? If yes, go to step 140; otherwise, go to the end.

Step 140: Is the difference between the packet link area and the predetermined super link point within a predetermined range? If yes, go to step 150; otherwise, go to step 110.

Step 150: The updated super link point is set within the packet link area.

In the embodiment of the present invention, the predetermined super link point is only provided for the initial area arrangement of the optical disk. Actual super link points are located according to the positions of the packet link areas after packet unit writing. As mentioned in steps 140 and 150, when a difference between the packet link area and the predetermined super link point is within a predetermined range, the updated super link point is set within the packet link area. When the optical disk is written to, the transmission rate changing super link points can be set in the packet link areas between the packet units. Therefore, there are no super link points in the user data areas of the packet units. This prevents the user data areas from being discontinuous.

Moreover, in the prior art, when a new packet unit is written, the optical disk drive has to re-accelerate the spindle motor. The present invention sets the super link points in the packet link areas so that the spindle motor can accelerate to the predetermined rotating speed according to the transmission rate for performing packet writing. Therefore, the present invention can improve the efficiency when the optical disk drive writes, which was reduced in the prior art due to the super link points being set in the user data areas.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of seamless ZCLV/PCAV recording for packet writing, the method comprising:
   providing a plurality of predetermined super link points for dividing a track of an optical disk into a plurality of areas;
   completely writing a packet unit on the track; and
   if a difference between a packet link area subsequent to the packet unit and a first predetermined super link point of the predetermined super link points is within a predetermined range, setting the first predetermined super link point to within the packet link area.

2. The method of claim 1 wherein the predetermined super link points are a plurality of timing points on the track.

3. The method of claim 1 wherein the optical disk is a CD-R optical disk.

4. The method of claim 1 wherein the optical disk is a CD-RW optical disk.

5. A method of seamless ZCLV/PCAV recording for packet writing, the method comprising:
   providing a predetermined super link point for dividing a track of an optical disk into different areas;
   completely writing a packet unit on the track; and
   if a difference between a packet link area subsequent to the packet unit and the predetermined super link point is within a predetermined range, resetting the predetermined super link point to within the packet link area.

6. The method of claim 5 wherein the predetermined super link point is a timing point on the track.

7. The method of claim 5 wherein the optical disk is a CD-R optical disk.

8. The method of claim 5 wherein the optical disk is a CD-RW optical disk.

9. A method of seamless ZCLV/PCAV recording for packet writing, the method comprising:
  providing at least one predetermined super link point for dividing a track of an optical disk into a plurality of data writing areas with different transmission rates; and
  sequentially writing a plurality of packet units on the track, there being a plurality of packet link areas between each packet unit;
  wherein at least one predetermined super link point is reset within the packet link areas.

10. The method of claim 9 wherein each super link point is a timing point on the track.

11. The method of claim 9 wherein the optical disk is a CD-R optical disk.

12. The method of claim 9 wherein the optical disk is a CD-RW optical disk.

* * * * *